US007723433B2

(12) United States Patent
Simmons et al.

(10) Patent No.: US 7,723,433 B2
(45) Date of Patent: May 25, 2010

(54) CLEAR, IMPACT MODIFIED, HEAT RESISTANT POLYVINYL HALIDE COMPOSITIONS

(75) Inventors: Larry B. Simmons, Washington, WV (US); George P. McCarty, Morgantown, WV (US)

(73) Assignee: Chemtura Corporation, Middlebury, CT (US)

(*) Notice: Subject to any disclaimer, the term of this patent is extended or adjusted under 35 U.S.C. 154(b) by 295 days.

(21) Appl. No.: 10/995,605

(22) Filed: Nov. 22, 2004

(65) Prior Publication Data

US 2006/0111515 A1    May 25, 2006

(51) Int. Cl.
*C08L 51/08*    (2006.01)
*C08F 220/12*    (2006.01)

(52) U.S. Cl. .............................. 525/63; 525/80; 525/84; 525/227; 525/228; 525/239

(58) Field of Classification Search ............... 526/329.2; 525/63, 80, 84, 227, 228, 239
See application file for complete search history.

(56) References Cited

U.S. PATENT DOCUMENTS

| 3,657,390 A | * | 4/1972 | Tanaka et al. ................. 525/83 |
| 5,166,271 A | | 11/1992 | Masuko et al. |
| 5,206,296 A | | 4/1993 | Dominique et al. |
| 5,210,140 A | * | 5/1993 | Greenlee et al. ............. 525/205 |
| 5,354,812 A | | 10/1994 | Soby et al. |

OTHER PUBLICATIONS

Technical Data for Blendex 866 ( Date: Aug. 1, 2003).*
J.Bicerano "Glass Transition" Encyclopedia of Polymer Science and Technology, pp. 1- 29, 2006.*

* cited by examiner

*Primary Examiner*—Milton I Cano
*Assistant Examiner*—Gennadiy Mesh
(74) *Attorney, Agent, or Firm*—JoAnn Villamizar

(57) ABSTRACT

A clear, impact modified, heat resistant polyvinyl chloride composition is provided comprising (a) at least one polyvinyl halide; (b) at least one clear impact modifier possessing a refractive index which is not more than about 2% above or below the refractive index of the polyvinyl halide; and (c) at least one clear heat modifier comprising a terpolymer obtained by the copolymerization of a vinyl aromatic monomer, an acrylonitrile and an alkyl acrylate or alkyl methacrylate, wherein the terpolymer possesses a refractive index which is not more than about 2% above or below the refractive index of the polyvinyl halide and possesses a weight average molecular weight ranging from about 75,000 to about 400,000.

11 Claims, No Drawings

CLEAR, IMPACT MODIFIED, HEAT RESISTANT POLYVINYL HALIDE COMPOSITIONS

BACKGROUND OF THE INVENTION

1. Field of the Invention

This invention relates to polyvinyl halide compositions that possess dimensional stability to heat, impact strength and clarity. More particularly, the invention relates to a polyvinyl halide composition which is excellent in optical properties, impact resistance and heat resistance and can be employed in a wide variety of applications such as films, sheets, pipes, cable ducts, deck plates, building materials, battery housings, and industrial components.

2. Description of the Related Art

Polyvinyl chloride resins (PVC) are well known thermoplastic resins that can be compounded with a variety of property enhancing additives and molded, extruded, calendered or formed for a variety of applications. The art of PVC compounding is extremely complex in that many ingredients interact with each other. This complexity means that levels of ingredients and types of ingredients must be varied to yield a PVC compound that is useful for a given application.

Articles such as bottles, packages and films for certain markets demand a high degree of clarity. A property of PVC that is important for many applications is its inherent clarity and transparency. However, PVC resins are generally quite brittle. To overcome this deficiency, rubbery impact modifiers having glass transition temperatures below that of PVC are incorporated into the resin. Impact modifiers based on graft copolymers prepared by conventional radical polymerization are well known and have been widely employed for over thirty years. Graft copolymers of styrene, α-methylstyrene, acrylonitrile, methacrylic acid esters or mixtures thereof on a rubber, e.g., polybutadiene or a butadiene copolymer, and mixtures of such graft polymers with polystyrene or styrene copolymers are well known PVC impact modifiers. A variety of clear PVC impact modifiers are now commercially available. These impact modifiers possess refractive indices that closely match that of PVC in order to preserve the clarity and transparency of the PVC resin.

The freezing temperature (glass transition temperature) of PVC is about 80° C. so that its dimensional stability to heat (Vicat temperatures of about 75° to 84° C.) is insufficient for many applications where prolonged exposure to heat is encountered. Attempts have been made to improve the dimensional stability (heat resistance) of PVC by modifying the molecular structure of PVC, carrying out chemical after-treatments or adding thermoplastic resins with higher glass transition temperatures to the PVC base resin. Typical heat distortion temperature (HDT) modifiers can be used to raise HDT, but the result is an opaque compound that does not allow for use in PVC compounds where clarity is required. Known HDT modifiers that are opaque include acrylonitrile-α methylstyrene copolymer, acrylonitrile-α methylstyrene-butadiene copolymer and polymethyl methacrylate-acrylic ester copolymer (PMMA).

U.S. Pat. No. 5,166,271 discloses a heat resistant PVC copolymer obtained by graft copolymerizing a vinyl chloride resin with N-substituted maleimide in the presence of a radical polymerizable monomer which (1) is liquid at the temperature of copolymerization, (2) is capable of dissolving the N-substituted maleimide and (3) has a glass transition temperature of the polymer of 70° C. or more.

U.S. Pat. No. 5,206,296 discloses a processing aid for polymeric compositions such as PVC comprising a high molecular weight terpolymer comprising 10-49% by weight of a vinyl aromatic monomer such as styrene, 5-35% by weight of acrylonitrile, and 21-60% of an alkyl acrylate or alkyl methacrylate. The terpolymer disclosed in U.S. Pat. No. 5,206,296 possesses a viscosity of more than four as measured in dimethylformamide as 30° C. at a concentration of 100 mg terpolymer per 100 ml dimethylformamide. The average molecular weights of the terpolymer processing aid exceed 2,000,000, and are used at levels of 0.1 to 20 parts by weight per 100 parts by weight of PVC.

U.S. Pat. No. 5,354,812 discloses ternary alloys of PVC, post-chlorinated PVC (CPVC), and alloying polymers wherein the alloying polymers enhance the heat distortion temperature of the CPVC.

A combination of clear impact modifier and clear heat modifier that provides improved PVC compositions characterized by their clarity (light transmission), heat distortion temperature, and impact strength would be a useful advance in the PVC compounding art.

SUMMARY OF THE INVENTION

It is an object of the invention to provide a clear, impact modified, heat resistant polyvinyl halide composition. In one embodiment, the polyvinyl halide composition comprises (a) at least one polyvinyl halide;

(b) at least one clear impact modifier possessing a refractive index which is not more than about 2% above or below the refractive index of the polyvinyl halide; and (c) at least one clear heat modifier comprising a terpolymer obtained by the copolymerization of a vinyl aromatic monomer, an acrylic nitrile and an alkyl acrylate or alkyl methacrylate, wherein the terpolymer possesses a refractive index which is not more than about 2% above or below the refractive index of the polyvinyl halide and possesses a weight average molecular weight ranging from about 75,000 to about 400,000; and wherein (a) comprises from about 20 to about 50 weight percent, (b) comprises from about 10 to about 30 weight percent, and (c) comprises from about 20 to about 80 weight percent, based on the combined weight of (a), (b) and (c).

DETAILED DESCRIPTION OF THE PREFERRED EMBODIMENTS

Clear, impact modified and heat modified polyvinyl halide compositions of the present invention can be prepared by conventional means such as, for example, melt-compounding a mixture of polyvinyl halide resin, clear impact modifier possessing a refractive index which is not more than about 2% above or below the refractive index of the polyvinyl halide, and clear heat modifier comprising a terpolymer obtained by the copolymerization of a vinyl aromatic monomer, an acrylic nitrile and an alkyl acrylate or alkyl methacrylate, wherein the terpolymer possesses a refractive index which is not more than about 2% above or below the refractive index of the polyvinyl chloride and possesses a weight average molecular weight ranging from about 75,000 to about 400,000.

The polyvinyl halide resins that are employed in the clear thermoplastic resin compositions of this invention include, for example, vinyl halide homopolymers, vinyl halide copolymers and polymer blends containing vinyl halide homopolymer or copolymers. Examples of vinyl halide homopolymers, include, but are not limited to, polyvinyl chloride, polyvinylidiene chloride, polyvinyl bromide, polyvinyl fluoride, and polyvinylidene fluoride. Examples of ethylenically unsaturated monomers which can be copolymerized with vinyl chloride include, but are not limited to, vinylidene chloride, vinyl acetate, vinyl butyrate, vinyl benzoate, diethyl fumarate, diethyl maleate, other alkyl fumarates and maleates, vinyl propionate methyl acrylate, 2-ethylhexyl acrylate, butyl acryalate, ethyl acrylate, and other alkyl acrylates, methyl methacrylate, ethyl methacrylate, butyl methacrylate, hydroxyethyl methacrylate and other alkyl methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene. Examples of polymer blends include, but are not limited to blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate.

The polymer blends usable in the practice of this invention can include physical blends of at least two distinct polymeric species and contain from about 25 to about 95 weight percent of vinyl halide homopolymer.

The term "impact modifier" in the context of this invention refers to rubber and rubber modified with a thermoplastic resin, which furthermore possesses a refractive index that is within plus or minus 2% of the refractive index of the polyvinyl halide resin, preferably a refractive index of not more than about 1% above or below the refractive index of the polyvinyl halide, and more preferably a refractive index which is not more than about 0.05% above or below the refractive index of the polyvinyl halide. Such impact modifiers are well known in the art.

The terpolymer of the clear heat modifier for use in the compostion of the present invention includes from about 30 to about 50 and preferably from about 35 to about 45% by weight of the vinyl aromatic monomers, from about 15 to about 35 and preferably from about 20 to about 30% by weight of the acrylic nitrile and from about 25 to about 45 and preferably from about 30 to about 40% by weight of the alkyl acrylate or alkyl methacrylate, based on the total weight of the terpolymer.

Suitable vinyl aromatic monomers include, but are not limited to, styrene, alpha methylstyrene, halogenated styrene, vinyltoluene, alkoxystyrene and other styrene derivatives that are copolymerizable with an acrylic nitrile and an alkyl methacrylate and the like and mixtures thereof.

Suitable acrylic nitrile monomers include, but are not limited to, methacrylonitrile, ethacrylonitrile, chloroacrylonitrile, acrylonitrile, and the like and mixtures thereof.

Suitable alkyl acrylates and alkyl methacrylates include, but are not limited to, methyl acrylate, ethyl acrylate and the corresponding methacrylates and the like and mixtures thereof.

Polymerization of the monomers can be carried out in accordance with well known polymerization procedures known to those skilled in the art. An important feature of the invention is the low average molecular weight of the terpolymer that, in turn, permits the use of much higher loadings of the heat modifier in the PVC resin compared to higher molecular weight HDT resins. The weight average molecular weight of the terpolymer will range from about 75,000 to about 400,000, and preferably from about 100,000 to about 200,000. The resulting terpolymer will also possess a refractive index that is within plus or minus 2% of the refractive index of the polyvinyl halide resin, preferably a refractive index of not more than about 1% above or below the refractive index of the polyvinyl halide, and more preferably a refractive index which is not more than about 0.05% above or below the refractive index of the polyvinyl halide.

The amount of polyvinyl halide resin can range from about 10 to about 80 weight percent, and preferably from about 20 to about 60 weight percent, based on the combined weight of polyvinyl halide resin, clear impact modifier and clear heat modifier. The clear impact modifier is employed at a loading of from about 0 to about 35 weight percent, preferably from about 10 to about 25 weight percent, based on the combined weight of polyvinyl halide resin, clear impact modifier and clear heat modifier. The clear heat modifier is employed in an amount of from about 20 to about 80 weight percent, preferably from about 25 to about 60 weight percent based on the combined weight of polyvinyl halide resin, clear impact modifier and clear heat modifier.

Accordingly, the polyvinyl halide compositions of the present invention can have the capacity to be impact-modified to achieve notched Izod values generally in excess of 100 N·m/m (of notch), desirably in excess of 200 N·m/m, and preferably in excess of 230 N·m/m. Illustrative impact modifiers include, but are not limited to, ethylene-vinyl acetate copolymer (EVA), ethylene-propylene copolymer (EPR), polybutadiene-acrylonitrile-styrene copolymer (ABS), polybutylacrylate-acrylonitrile-styrene copolymer (ASA), polybutadiene-styrene-methyl methacrylate (MBS), polybutylacrylate, crosslinked acrylic rubber, styrene-butadiene copolymer (SBR) and acrylonitrile-butadiene copolymer (NBR).

In one embodiment, a process for preparing a clear, impact modified, heat resistant polyvinyl chloride composition includes the steps of combining components (a), (b) and (c) of the above-identified polyvinyl chloride composition in any known manner.

If desired, the composition may further include conventional additives such as, for example, heat stabilizers, antioxidants, lubricants, toners, colorants, dyes, and the like as is commonly practiced in the art of compounding clear impact modified polyvinyl halide resins. Compounding may be accomplished by conventional means, including Banbury mixers, heated roll mills, compounding extruders, and the like. Alternatively, for many applications the components will be mixed in powdered form, using any of a variety of high intensity mixers, to provide a dry powdered composition which will then be fabricated by methods such as calendering, milling, blow molding, and the like.

The practice of this invention will be better understood by consideration of the following Examples. All parts given are by weight unless otherwise indicated. Transparency refers to the transmitted intensity for all light that deviates by an angle $\theta > 25°$, as a percentage of the incident-light intensity. Haze refers to the integrated, transmitted intensity for all light that deviates by an angle $\theta < 25°$, as percentage of the incident-light intensity. Impact strengths are reported as ⅛" notched Izod (NI) according to ASTM D256-2002 at 25° C. unless otherwise specified. Yellowing is measured by yellowness index (YI). These Examples are provided by way of illustration of the invention and are not intended to be limiting.

Examples 1-20 and Comparative Example A

The following components set forth in Table 1 were compounded to form PVC compositions in accordance with the present invention:

TABLE 1

| Component | Composition |
|---|---|
| PVC K60 (614) | Polyvinyl chloride resin available from Formosa . . . R.I. = ~1.54 available from Formosa Corp. |
| PVC K66 (110 × 427) | Polyvinyl chloride resin available from Polyone R.I. = ~1.54 available from Formosa Corp. |
| HDT Modifier | Terpolymer comprising 20-60% styrene, 10-40% acrylonitrile and 15-55% methyl methacrylate, R.I. = ~1.53-1.55, M.W. = 75,000-400,000 available from Crompton Corporation, Middlebury, CT |
| B336 | Blendex 336 Impact Modifier available from Crompton Corporation, Middlebury, CT comprising Acrylonitrile-polybutadiene-styrene (ABS) |
| Mark 1900 | Organotin heat stabilizer available from Crompton Corporation, Middlebury, CT |
| G70S | Complex ester from Cognis Corp. |
| G16 | Fatty acid ester of glycerine from Cognis Corp. |
| B866 | Blendex 866 processing aid containing methylmathacrylate-acrylonitrile-styrene available from Crompton Corporation, Middlebury, CT |

The compositions of Examples 1-20 and Comparative Example A were then evaluated in accordance with the following test methodologies as set forth in Table II:

TABLE II

| Test | Description |
|---|---|
| Izod | D256-2002 |
| Heat Distortion Temperature | D648 |
| Vicat | D1525-96 |
| Capillary | D3835-2002 |
| Haze and Transmittance | D1003 |

The following Examples 1-20 and Comparative A are set forth in Table III. The amounts of components in the composition are given in parts by weight.

TABLE III

| Component | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| PVC K60 (614) | 40.00 | 50.00 | 30.00 | 25.00 | 25.00 | 25.00 | 41.67 | 25.00 | 30.42 | 29.17 | 40.00 |
| PVC K66 (110 × 427) | 15.00 | 0.00 | 5.00 | 15.00 | 0.00 | 15.00 | 6.67 | 0.00 | 16.67 | 6.67 | 0.00 |
| HDT Modifier | 35.00 | 35.00 | 40.00 | 50.00 | 50.00 | 35.00 | 39.17 | 60.00 | 40.42 | 51.67 | 50.00 |
| B336 | 10.00 | 15.00 | 25.00 | 10.00 | 25.00 | 25.00 | 12.50 | 15.00 | 12.50 | 12.50 | 10.00 |
| Mark 1900 | 2.0 | 2.0 | 2.0 | 2.0 | 2.0 | 2.0 | 2.0 | 2.0 | 2.0 | 2.0 | 2.0 |
| G70S | 1.0 | 1.0 | 1.0 | 1.0 | 1.0 | 1.0 | 1.0 | 1.0 | 1.0 | 1.0 | 1.0 |
| G16 | 1.0 | 1.0 | 1.0 | 1.0 | 1.0 | 1.0 | 1.0 | 1.0 | 1.0 | 1.0 | 1.0 |
| B866 | 1.0 | 1.0 | 1.0 | 1.0 | 1.0 | 1.0 | 1.0 | 1.0 | 1.0 | 1.0 | 1.0 |
| Izod Impact 1/8 in. | 1.415 | 11.562 | 15.581 | 0.802 | 12.394 | 17.528 | 4.276 | 1.637 | 4.352 | 1.465 | 0.619 |
| Std. Dev. | 0.138 | 0.150 | 0.307 | 0.066 | 0.262 | 0.320 | 0.172 | 0.060 | 0.125 | 0.229 | 0.061 |
| HDT 66 PSI 0.125 inch (° C.) | 77 | 78 | 79 | 80 | 80 | 78 | 78 | 80 | 79 | 80 | 80 |
| HDT 264 PSI 0.125 inch (° C.) | 73 | 73 | 74 | 75 | 75 | 71 | 74 | 76 | 74 | 74 | 75 |
| Vicat (° C.) | 81 | 81 | 81 | 84 | 83 | 81 | 83 | 84 | 82 | 84 | 84 |
| Opticals 0.125 inch | | | | | | | | | | | |
| trans. | 66.007 | 68.453 | 65.178 | 68.449 | 65.705 | 66.28 | 68.271 | 69.655 | 69.576 | 69.239 | 69.342 |
| YI | 31.074 | 32.254 | 39.601 | 29.904 | 38.651 | 38.85 | 31.253 | 32.56 | 29.406 | 30.498 | 29.791 |
| Haze | 31.763 | 27.696 | 30.487 | 30.582 | 30.488 | 30.488 | 26.762 | 25.383 | 26.535 | 25.822 | 25.457 |
| Capillary rheometer - 190 deg. C., 0.040 orifice, 100-1000 1/sec | | | | | | | | | | | |
| 100 | 29468 | 29163 | 30643 | 26400 | 27170 | 32993 | 28651 | 23739 | 29557 | 25691 | 24926 |
| 500 | 9787 | 9741 | 9963 | 8962 | 9011 | 10553 | 9627 | 8153 | 9723 | 8779 | 8538 |
| 1000 | 5945 | 5950 | 6086 | 5553 | 5600 | 6382 | 5901 | 5126 | 5947 | 5487 | 5324 |

| Component | Example 12 | Example 13 | Example 14 | Example 15 | Example 16 | Example 17 | Example 18 | Example 19 | Example 20 | Comparative Example A |
|---|---|---|---|---|---|---|---|---|---|---|
| PVC K60 (614) | 35.00 | 25.00 | 25.00 | 29.17 | 25.00 | 40.00 | 40.00 | 25.00 | 50.00 | 100.00 |
| PVC K66 (110 × 427) | 4.17 | 0.00 | 25.00 | 11.67 | 0.00 | 0.00 | 0.00 | 25.00 | 0.00 | 0.00 |
| HDT Modifier | 45.00 | 60.00 | 35.00 | 39.17 | 50.00 | 35.00 | 50.00 | 35.00 | 35.00 | 0.00 |
| B336 | 15.83 | 15.00 | 15.00 | 20.00 | 25.00 | 25.00 | 10.00 | 15.00 | 15.00 | 12.00 |
| Mark 1900 | 2.0 | 2.0 | 2.0 | 2.0 | 2.0 | 2.0 | 2.0 | 2.0 | 2.0 | 2.0 |
| G70S | 1.0 | 1.0 | 1.0 | 1.0 | 1.0 | 1.0 | 1.0 | 1.0 | 1.0 | 1.0 |

TABLE III-continued

| | | | | | | | | | | |
|---|---|---|---|---|---|---|---|---|---|---|
| G16 | 1.0 | 1.0 | 1.0 | 1.0 | 1.0 | 1.0 | 1.0 | 1.0 | 1.0 | 1.0 |
| B866 | 1.0 | 1.0 | 1.0 | 1.0 | 1.0 | 1.0 | 1.0 | 1.0 | 1.0 | 1.0 |
| Izod Impact 1/8 in. | 8.104 | 1.686 | 12.435 | 15.732 | 12.516 | 16.484 | 0.595 | 12.408 | 11.081 | 23.977 |
| Std. Dev. | 0.193 | 0.181 | 0.433 | 0.317 | 0.301 | 0.208 | 0.085 | 0.26 | 0.207 | 0.315 |
| HDT 66 PSI 0.125 inch (° C.) | 79 | 81 | 78 | 78 | 80 | 78 | 80 | 78 | 78 | 73 |
| HDT 264 PSI 0.125 inch (° C.) | 75 | 76 | 74 | 74 | 75 | 74 | 76 | 73 | 73 | 70 |
| Vicat (° C.) | 82 | 84 | 82 | 82 | 83 | 81 | 84 | 82 | 81 | 79 |
| Opticals 0.125 inch | | | | | | | | | | |
| trans. | 69.118 | 68.226 | 68.767 | 68.166 | 66.201 | 66.158 | 68.677 | 69.402 | 69.178 | 73.741 |
| YI | 32.044 | 34.097 | 31.812 | 35.075 | 38.496 | 39.104 | 29.01 | 30.81 | 31.628 | 24.75 |
| Haze | 26.612 | 26.335 | 27.295 | 27.88 | 30.289 | 29.761 | 27.58 | 27.685 | 27.385 | 30.353 |
| Capillary rheometer - 190 deg. C., 0.040 orifice, 100-1000 1/sec | | | | | | | | | | |
| 100 | 27638 | 23467 | 32039 | 30083 | 27321 | 30078 | 24449 | 32378 | 29073 | 39362 |
| 500 | 9228 | 7846 | 10348 | 9815 | 9069 | 9868 | 8436 | 10448 | 9681 | 12141 |
| 1000 | 5708 | 4956 | 6242 | 5991 | 5612 | 6016 | 5258 | 6307 | 5910 | 7191 |

The above results show the following advantages of the present invention as exemplified in Examples 1-20 as compared with Comparative Example A.

More particularly, Examples 1-20 show a higher heat distortion temperature. For example, at 264 PSI, all of the Examples possessed a heat distortion temperature ranging from 71° C. to 76° C. whereas Comparative Example A was at 70° C.

Moreover, the blend of the invention provides a composition having easier processing characteristics as demonstrated by the dramatically lower viscosities of the molten blends as compared to the Comparative Example A.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A clear, impact modified, heat resistant polyvinyl halide composition comprising:
   (a) from about 20 to about 60 weight percent of at least one polyvinyl halide, based on the total combined weight of (a), (b) and (c);
   (b) from about 10 to about 25 weight percent of at least one clear impact modifier, based on the total combined weight of (a), (b) and (c), wherein the at least one clear impact modifier comprises a rubber and possesses a refractive index which is not more than about 2% above or below the refractive index of the polyvinyl halide; and
   (c) from about 25 to about 60 weight percent of at least one clear heat modifier, based on the total combined weight of (a), (b) and (c), wherein the at least on clear heat modifier consists of:
   from about 20 to about 60 weight percent of styrene, based on the total weight of the at least one clear heat modifier,
   from about 10 to 40 weight percent of an acrylonitrile, based on the total weight of the at least one clear heat modifier, and
   from about 15 to 55 weight percent of a methyl methacrylate, based on the total weight of the at least one clear heat modifier,
   wherein the at least one clear heat modifier possesses a refractive index which is not more than about 2% above or below the refractive index of the polyvinyl halide and is in the range of 1.53 to 1.55, and possesses a weight average molecular weight ranging from about 75,000 to about 400,000.

2. The polyvinyl halide composition of claim 1, wherein the at least one clear heat modifier possesses a weight average molecular weight from about 100,000 to about 200,000.

3. The polyvinyl halide composition of claim 1, wherein the polyvinyl halide is selected from the group consisting of vinyl halide homopolymers, vinyl halide copolymers and mixtures thereof.

4. The polyvinyl halide composition of claim 3, wherein the vinyl halide homopolymers are selected from the group consisting of polyvinyl chloride, polyinylidiene chloride, polyvinyl bromide, polyvinyl fluoride, polyvinylidene fluoride and mixtures thereof.

5. The polyvinyl halide composition of claim 1, wherein the impact modifier comprises a rubber modified with a thermoplastic resin.

6. The polyvinyl halide compositions of claim 5, wherein the impact modifiers are selected from a group consisting of ethylene-vinyl acetate copolymer, ethylene-propylene copolymer, polybutadiene-acrylonitrile-styrene copolymer, polybutadiene-styrene-methyl methacrylate, polybutylacrylate, crosslinked acrylic rubber, styrene-butadiene copolymer and acrylonitrile-butadiene copolymer.

7. The polyvinyl halide composition of claim 1, characterized in that the ⅛ inch Izod impact strength measured at a temperature of 23° C. is at least about 1.0 ft-lb/in.

8. The polyvinyl halide composition of claim 1, wherein the impact modifier possesses a refractive index which is not more than about 1% above or below the refractive index of the polyvinyl halide.

9. The polyvinyl halide composition of claim 1, wherein the impact modifier possesses a refractive index which is not more than about 0.05% above or below the refractive index of the polyvinyl halide.

10. The polyvinyl halide composition of claim 1, wherein the at least one clear heat modifier possesses a refractive index which is not more than about 1% above or below the refractive index of the polyvinyl halide.

11. The polyvinyl halide composition of claim 1, wherein the at least one clear heat modifier possesses a refractive index which is not more than about 0.05% above or below the refractive index of the polyvinyl halide.

* * * * *